US012116119B2

(12) United States Patent
Min et al.

(10) Patent No.: US 12,116,119 B2
(45) Date of Patent: Oct. 15, 2024

(54) HIGH SPEED ROTOR BLADE DESIGN

(71) Applicant: LOCKHEED MARTIN CORPORATION, Bethesda, MD (US)

(72) Inventors: Byung-Young Min, Trumbull, CT (US); Vera Klimchenko, Silver Spring, MD (US); Annie Gao, Norwalk, CT (US); Alexander F. Dunn, Easton, CT (US); Claude George Matalanis, Monroe, CT (US); Brian Ernest Wake, Monroe, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 207 days.

(21) Appl. No.: 17/706,531

(22) Filed: Mar. 28, 2022

(65) Prior Publication Data
US 2023/0322373 A1 Oct. 12, 2023

(51) Int. Cl.
*B64C 27/46* (2006.01)
*B64C 27/467* (2006.01)
*B64C 27/473* (2006.01)

(52) U.S. Cl.
CPC .......... *B64C 27/467* (2013.01); *B64C 27/473* (2013.01)

(58) Field of Classification Search
CPC ...... B64C 27/46; B64C 27/467; B64C 27/473
See application file for complete search history.

(56) References Cited

U.S. PATENT DOCUMENTS

| 5,332,362 | A | | 7/1994 | Toulmay et al. | |
|---|---|---|---|---|---|
| 6,000,911 | A | * | 12/1999 | Toulmay | B64C 27/463 416/223 R |
| 6,116,857 | A | * | 9/2000 | Splettstoesser | B64C 27/467 416/228 |
| 6,497,385 | B1 | * | 12/2002 | Wachspress | B64C 27/28 416/223 R |
| 7,252,479 | B2 | * | 8/2007 | Bagai | B64C 27/467 416/223 R |
| 8,128,376 | B2 | * | 3/2012 | Karem | B64C 27/467 416/228 |
| 10,220,943 | B2 | | 3/2019 | Leusink et al. | |
| 10,414,490 | B2 | * | 9/2019 | Leusink | B64C 27/473 |
| 10,648,340 | B2 | | 5/2020 | Darrow | |

(Continued)

FOREIGN PATENT DOCUMENTS

GB  2486021 A  *  6/2012 ........... B64C 27/463

*Primary Examiner* — Brian Christopher Delrue
*Assistant Examiner* — Joshua R Beebe
(74) *Attorney, Agent, or Firm* — Foley & Lardner LLP

(57) ABSTRACT

A rotary wing aircraft includes a single main rotor hub configured to receive a rotor blade. The rotor blade includes a blade root, a blade tip, and a blade body. The blade body includes a leading edge and a trailing edge and defines a feathering axis. The leading edge and the trailing edge each include a first portion and a second portion that extend toward a first direction and a second portion, respectively. At a given radial location along the feathering axis, a local twist angle changes from a positive value to a negative value, a chord length decreases in value, a distance between the trailing edge and the feathering axis decreases in value, and the first portion of the leading edge extends toward the first direction. The rotor blade assembly also includes a trailing edge assembly having a trailing edge flap configured to be selectively deployed by an actuator.

20 Claims, 9 Drawing Sheets

(56) References Cited

U.S. PATENT DOCUMENTS

| | | |
|---|---|---|
| 10,822,076 B2 | 11/2020 | Hunter et al. |
| 10,899,440 B2 | 1/2021 | Sargent et al. |
| 2017/0183089 A1* | 6/2017 | Hardick ................ B64C 27/473 |

* cited by examiner

| Airfoil Distribution | | | | | | | | | | | |
|---|---|---|---|---|---|---|---|---|---|---|---|
| % Span | 0-20 | 20-30 | 30-40 | 40-50 | 50-60 | 60-70 | 70-80 | 80-85 | 85-90 | 90-94 | 95-96 | 97-100 |
| Airfoil | VR12t12.5 | VR12t12.5 | VR12t12.5 | VR12 | VR12 | VR12 | VR12 | VR12 | SC36211 | SC36211 | SC36211 | SC362115 |

FIG. 5

| r/R | Twist (deg) |
|---|---|
| 0.0000 | 9.1500 |
| 0.1238 | 9.1500 |
| 0.1712 | 9.1500 |
| 0.2000 | 9.1500 |
| 0.3000 | 7.3500 |
| 0.6000 | 1.9500 |
| 0.7500 | 0.0000 |
| 0.7618 | -0.1538 |
| 0.8750 | -1.6250 |
| 0.9200 | -3.3250 |
| 1.0000 | -3.3250 |

| r/R | c/Cref |
|---|---|
| 0.00000 | 0.85000 |
| 0.04734 | 0.85000 |
| 0.19786 | 0.85000 |
| 0.20000 | 0.85000 |
| 0.22000 | 0.85000 |
| 0.24000 | 0.85000 |
| 0.26000 | 0.85000 |
| 0.28000 | 0.85000 |
| 0.30000 | 0.85000 |
| 0.32000 | 0.85146 |
| 0.34000 | 0.85581 |
| 0.36000 | 0.86297 |
| 0.38000 | 0.87279 |
| 0.40000 | 0.88509 |
| 0.42000 | 0.89963 |
| 0.44000 | 0.91612 |
| 0.46000 | 0.93424 |
| 0.48000 | 0.95365 |
| 0.50000 | 0.97395 |
| 0.52000 | 0.99477 |
| 0.54000 | 1.01568 |
| 0.56000 | 1.03629 |
| 0.58000 | 1.05619 |
| 0.60000 | 1.07500 |
| 0.62000 | 1.09235 |
| 0.64000 | 1.10790 |
| 0.66000 | 1.12135 |
| 0.68000 | 1.13244 |
| 0.70000 | 1.14095 |
| 0.72000 | 1.14672 |
| 0.74000 | 1.14964 |
| 0.76000 | 1.15000 |
| 0.78000 | 1.15000 |
| 0.80000 | 1.15000 |
| 0.82000 | 1.15000 |
| 0.84000 | 1.15000 |
| 0.86000 | 1.14534 |
| 0.88000 | 1.10840 |
| 0.90000 | 1.03612 |
| 0.92000 | 0.93167 |
| 0.94000 | 0.79962 |
| 0.96000 | 0.64573 |
| 0.98000 | 0.47673 |
| 1.00000 | 0.30000 |
FIG. 7C
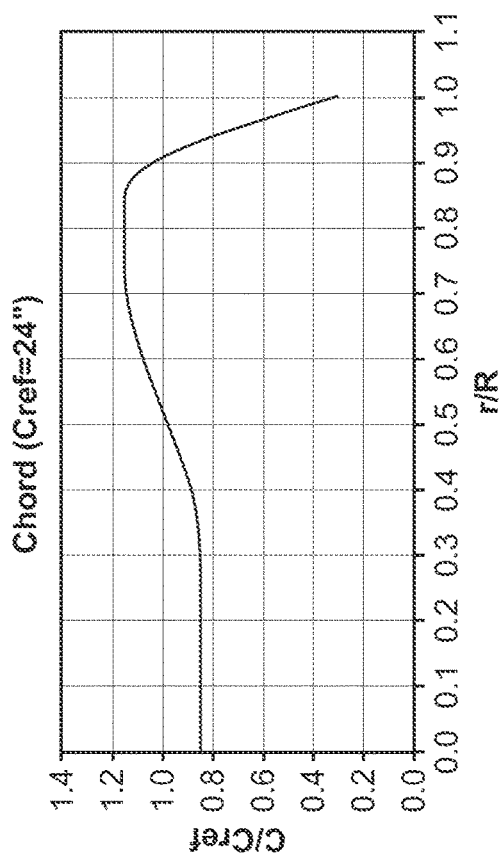
FIG. 7A
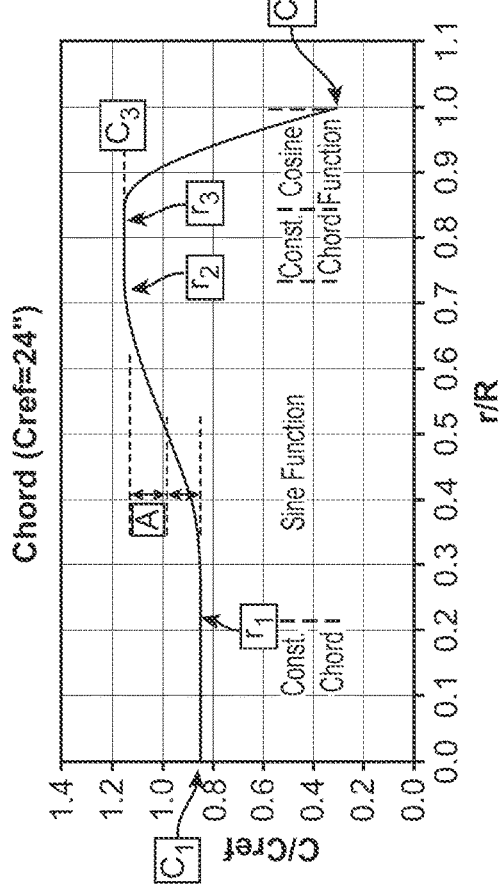
FIG. 7B

| r/R | YQC/Cref | ZQC/Cref |
|---|---|---|
| 0.00000 | 0 | 0 |
| 0.04734 | 0.00000 | 0.00000 |
| 0.82852 | 0.00000 | 0.00000 |
| 0.83805 | -0.00347 | 0.00000 |
| 0.84590 | -0.01321 | 0.00000 |
| 0.84757 | -0.01602 | 0.00000 |
| 0.84780 | -0.01642 | 0.00000 |
| 0.85000 | -0.02050 | 0.00000 |
| 0.85710 | -0.03604 | 0.00000 |
| 0.86500 | -0.05634 | 0.00000 |
| 0.86663 | -0.06076 | 0.00000 |
| 0.87615 | -0.08675 | 0.00000 |
| 0.88568 | -0.11043 | 0.00000 |
| 0.89521 | -0.12852 | 0.00000 |
| 0.89658 | -0.13051 | 0.00000 |
| 0.89829 | -0.13273 | 0.00000 |
| 0.90000 | -0.13467 | 0.00000 |
| 0.90100 | -0.13567 | 0.00000 |
| 0.90473 | -0.13851 | 0.00000 |
| 0.91000 | -0.14000 | 0.00000 |
| 0.91426 | -0.14000 | 0.00000 |
| 0.92000 | -0.13796 | 0.00000 |
| 0.92379 | -0.13487 | 0.00000 |
| 0.92600 | -0.13487 | 0.00000 |
| 0.93000 | -0.12578 | 0.00000 |
| 0.93331 | -0.11486 | 0.00000 |
| 0.94284 | -0.06682 | 0.00000 |
| 0.95000 | -0.01529 | 0.00000 |
| 0.95237 | 0.00448 | 0.00000 |
| 0.96000 | 0.07674 | 0.00000 |
| 0.96189 | 0.09655 | 0.00000 |
| 0.97142 | 0.20619 | 0.00000 |
| 0.98095 | 0.32957 | 0.00000 |
| 0.99047 | 0.46238 | 0.00000 |
| 1.00000 | 0.60000 | 0.00000 |
FIG. 8C
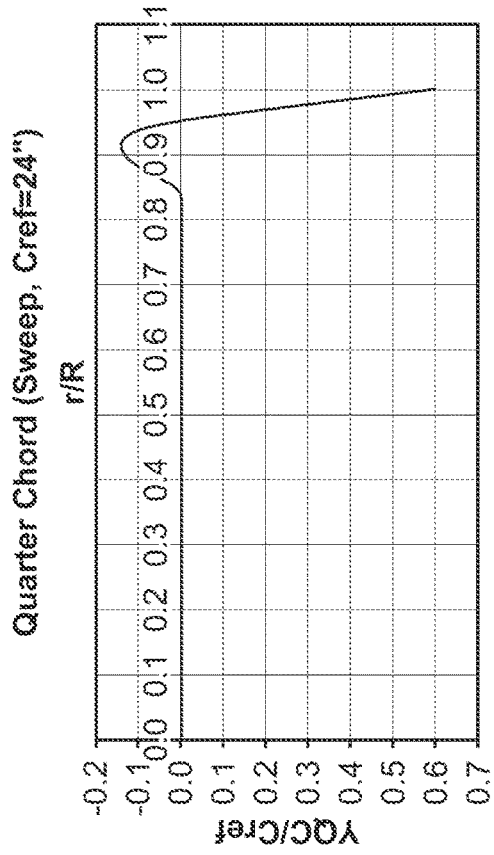
FIG. 8A
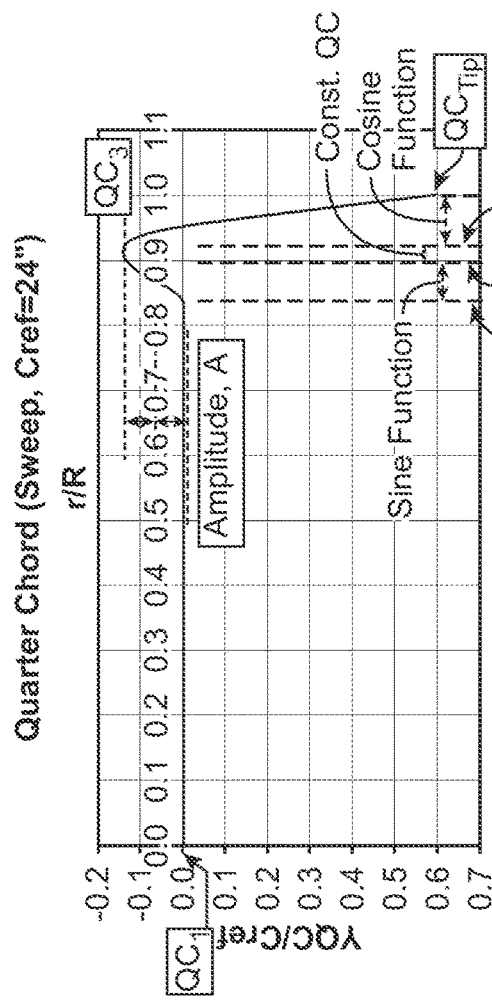
FIG. 8B

HIGH SPEED ROTOR BLADE DESIGN

STATEMENT REGARDING FEDERALLY SPONSORED RESEARCH OR DEVELOPMENT

This invention was made with Government support under Agreement No. W911W6-20-2-0003, awarded by the Army Contracting Command. The Government has certain rights in the invention.

FIELD

The present application relates generally to rotor blade assemblies for a rotary wing aircraft.

BACKGROUND

In rotor blade assemblies, typical rotor blade design is a compromise between forward flight performance and hover flight performance (e.g., a twist or chord distribution appropriate for hover performance may not be as preferable for forward flight, etc.). Accordingly, a rotor blade design tailored for forward flight typically shows degraded hover flight performance. One solution for providing a rotor blade assembly with enhanced forward and hover flight performance is to provide the rotor blade with an active flow control device to change lift and drag of the rotor blade.

SUMMARY

In some systems, a rotor blade is provided with a passive planform to improve forward flight and hover performance, and hover performance may be further enhanced with an active flow control device.

However, active flow control devices utilizing controllers such as high frequency actuators may be less effective under rotor blade operating conditions. Further, other systems with enhanced forward and hover flight performance may require a coaxial main rotor system rather than a single main rotor system, which increases overall weight and manufacturing costs of the rotor blade assembly.

The present disclosure relates to a rotor blade assembly and a method thereof to provide a rotor blade conducive to forward flight while also maintaining enhanced hover performance. Particularly, such rotor blade assemblies and methods thereof include a rotor blade having a unique airfoil distribution, twist distribution, chord distribution, and forward-aft sweep without anhedral (downward inclination of a rotor blade at an outboard region). Further, the rotor blade assembly may include a deployable trailing edge assembly, which may be stowed and not deployed during forward flight and deployed during hover flight for additional performance benefits. Such a rotor blade is tailored for forward flight, and the trailing edge assembly may be selectively deployed to provide enhanced hover flight performance.

Various embodiments provide for a rotary wing aircraft. In at least one embodiment, the rotor blade assembly includes a single main rotor hub configured to receive a rotor blade, the rotor blade having a blade root coupled to the rotor hub, a blade tip, and a blade body extending from the blade root to the blade tip and including a leading edge and a trailing edge, the blade body defining a feathering axis, the leading edge and the trailing edge each include a first portion that extends toward a first direction and a second portion that extends toward a second direction opposite the first direction, and at a given radial location along the feathering axis, (i) a local twist angle of the rotor blade changes from a positive value to a negative value, (ii) a chord length extending from the leading edge to the trailing edge decreases in value from a first chord length, (iii) a distance between the trailing edge and the feathering axis decreases in value from a first distance, and (iv) the first portion of the leading edge extends toward the first direction; and a trailing edge assembly comprising a trailing edge flap comprising at least one segment and extending along the trailing edge from the blade root towards the blade tip, the trailing edge flap configured to be selectively deployed between at least a first position and a second position, and an actuator disposed within the blade body and operatively coupled to the trailing edge flap, the actuator being configured to selectively deploy the trailing edge flap between at least the first position or the second position.

Various embodiments provide for a rotor blade of a rotor blade assembly. In one embodiment, the rotor blade includes a blade root; a blade tip; and a blade body extending from the blade root to the blade tip and comprising a leading edge and a trailing edge, the blade body defining a feathering axis, the leading edge and the trailing edge each include a first portion that extends toward a first direction and a second portion that extends toward a second direction opposite the first direction, and at a given radial location along the feathering axis, (i) a chord length extending from the leading edge to the trailing edge decreases in value from a first chord length, (ii) a distance between the trailing edge and the feathering axis decreases in value from a first distance, and (iii) the first portion of the leading edge extends toward the first direction.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which:

FIG. 5 is a chart describing an airfoil distribution of the rotor blade as shown in FIG. 2;

FIG. 7A is a graph illustrating a chord length of the rotor blade by plotting a normalized chord length relative to a normalized radial location, according to an exemplary embodiment;

FIG. 7B is an annotated graph illustrating the normalized chord length relative to the normalized radial location as shown in FIG. 7A;

FIG. 7C is a chart describing the normalized chord length relative to a normalized radial location as shown in FIG. 7A;

FIG. 8A is a graph illustrating a sweep distribution of the rotor blade by plotting a normalized chord-wise quarter chord location relative to a normalized radial location, according to an exemplary embodiment;

FIG. 8B is an annotated graph illustrating a sweep distribution of the rotor blade by plotting a normalized chordwise quarter chord location relative to a normalized radial location as shown in FIG. 8A;

FIG. 8C is a chart describing the normalized chord-wise quarter chord location relative to a normalized radial location as shown in FIG. 8A.

Figure 1:
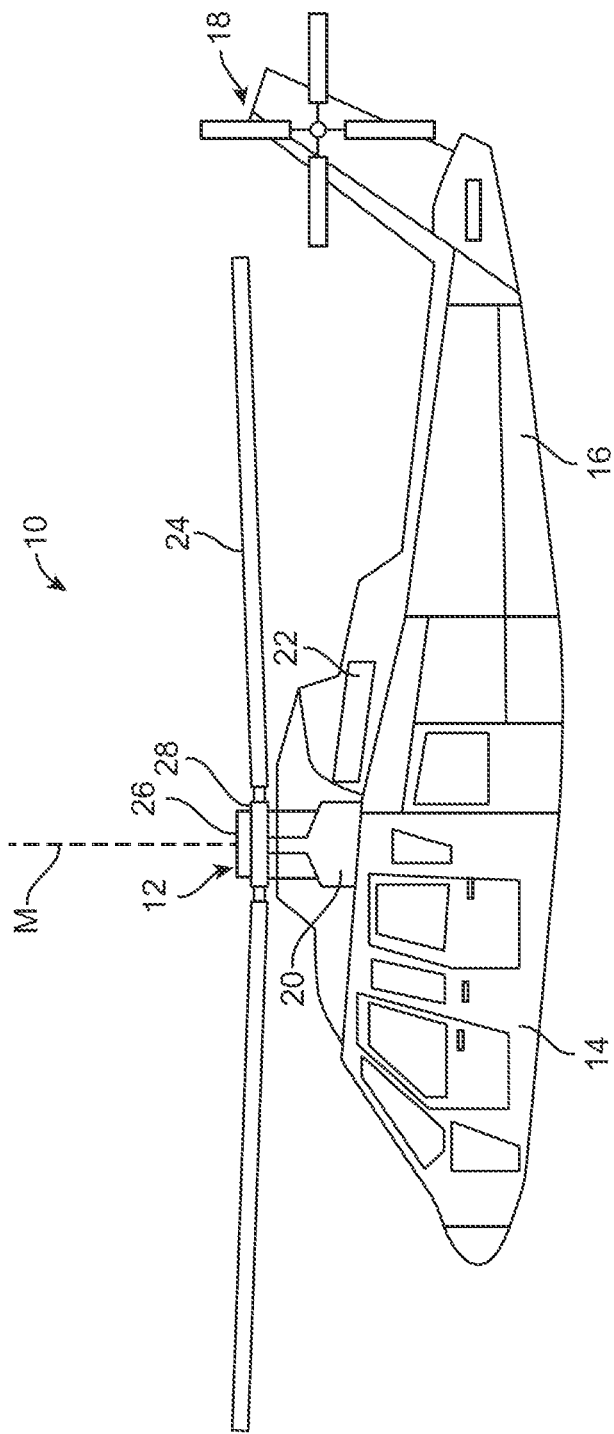
FIG. 1 is a side view of a rotary wing aircraft (including but not limited to an aircraft having a single main rotor), according to an exemplary embodiment.

It will be recognized that the Figures are the schematic representations for purposes of illustration. The Figures are provided for the purpose of illustrating one or more implementations with the explicit understanding that the Figures will not be used to limit the scope of the meaning of the claims.

DETAILED DESCRIPTION

Following below are more detailed descriptions of various concepts related to, and implementations of, methods, apparatuses, and for providing a trailing edge assembly for a rotor blade assembly. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Referring to the figures generally, various embodiments disclosed herein relate to a rotor blade for a rotor blade assembly. As explained in more detail herein, the rotor blade assembly includes a single main rotor system and a rotor blade having a unique airfoil distribution, twist distribution, chord distribution, and forward-aft sweep without anhedral. Further, the rotor blade assembly may include a trailing edge assembly having an actuator configured to selectively deploy a trailing edge flap to provide enhanced hover performance as needed, even when the rotor blade is designed for forward flight. Other configurations of trailing edge assemblies utilize high frequency actuators, which may be less effective under rotor blade operating conditions. In particular, high frequency actuators may impact other portions of the rotor blade rather than being contained within a local trailing edge region of the rotor blade.

Implementations described herein are related to a rotor blade assembly with a rotor blade optimized for forward flight and enhanced hover performance. The rotor blade assembly includes a single main rotor hub configured to receive a rotor blade. The rotor includes a rotor blade having a blade root coupled to the rotor hub, a blade tip, and a blade body extending from the blade root to the blade tip. The blade body includes a leading edge and a trailing edge and defines a feathering axis. The leading edge and the trailing edge each include a first portion that extends toward a first direction and a second portion that extends toward a second direction opposite the first direction. Further, within a given radial region, a local twist angle of the rotor blade changes from a positive value to a negative value, a chord length extending from the leading edge to the trailing edge decreases in value from a first chord length, a distance between the trailing edge and the feathering axis decreases in value from a first distance, and the first portion of the leading edge extends toward the first direction. The rotor blade assembly also includes a trailing edge assembly. The trailing edge assembly includes a trailing edge flap having at least one segment and extending along the trailing edge from the blade root towards the blade tip. The trailing edge flap is configured to be selectively deployed between at least a first position and a second position. The trailing edge assembly also includes an actuator. The actuator is disposed within the blade body and operatively coupled to the trailing edge flap, and is configured to selectively deploy the trailing edge flap between at least the first position and the second position.

Accordingly, the rotor blade includes a unique twist distribution, chord distribution, and sweep distribution that is conducive to forward flight and hover performance during forward flight. Further, the trailing edge assembly (e.g., an active flow control device, etc.) provides enhanced hovering flight performance, when deployed. In this way, the rotor blade design is not limited to configurations that would otherwise reduce hover performance during hovering flight.

II. Overview of Example Rotor Blade Assemblies

Figure 2:
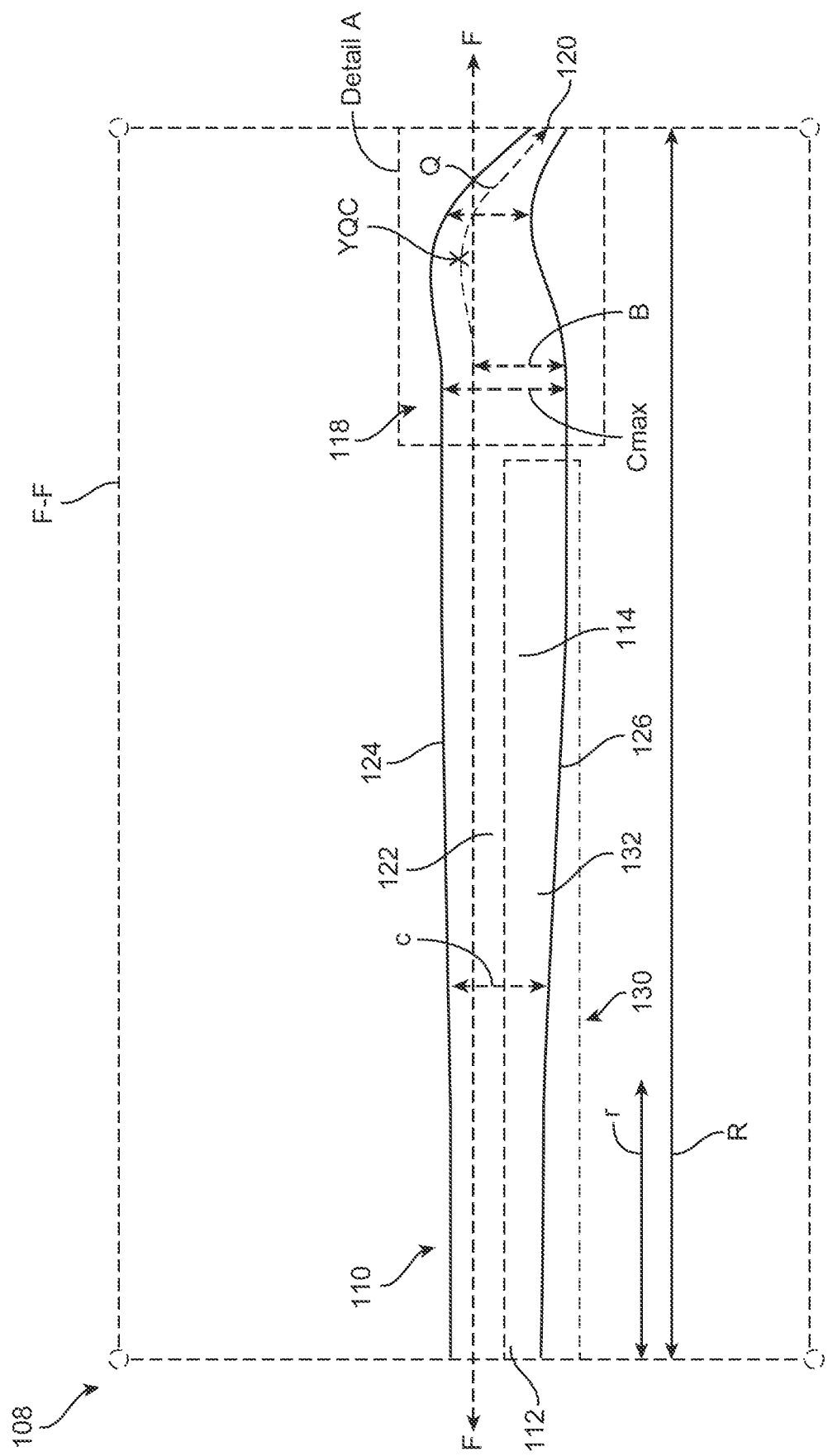
FIG. 2 is a top view of a rotor blade of a rotor blade assembly, according to an exemplary embodiment.
Figure 3:
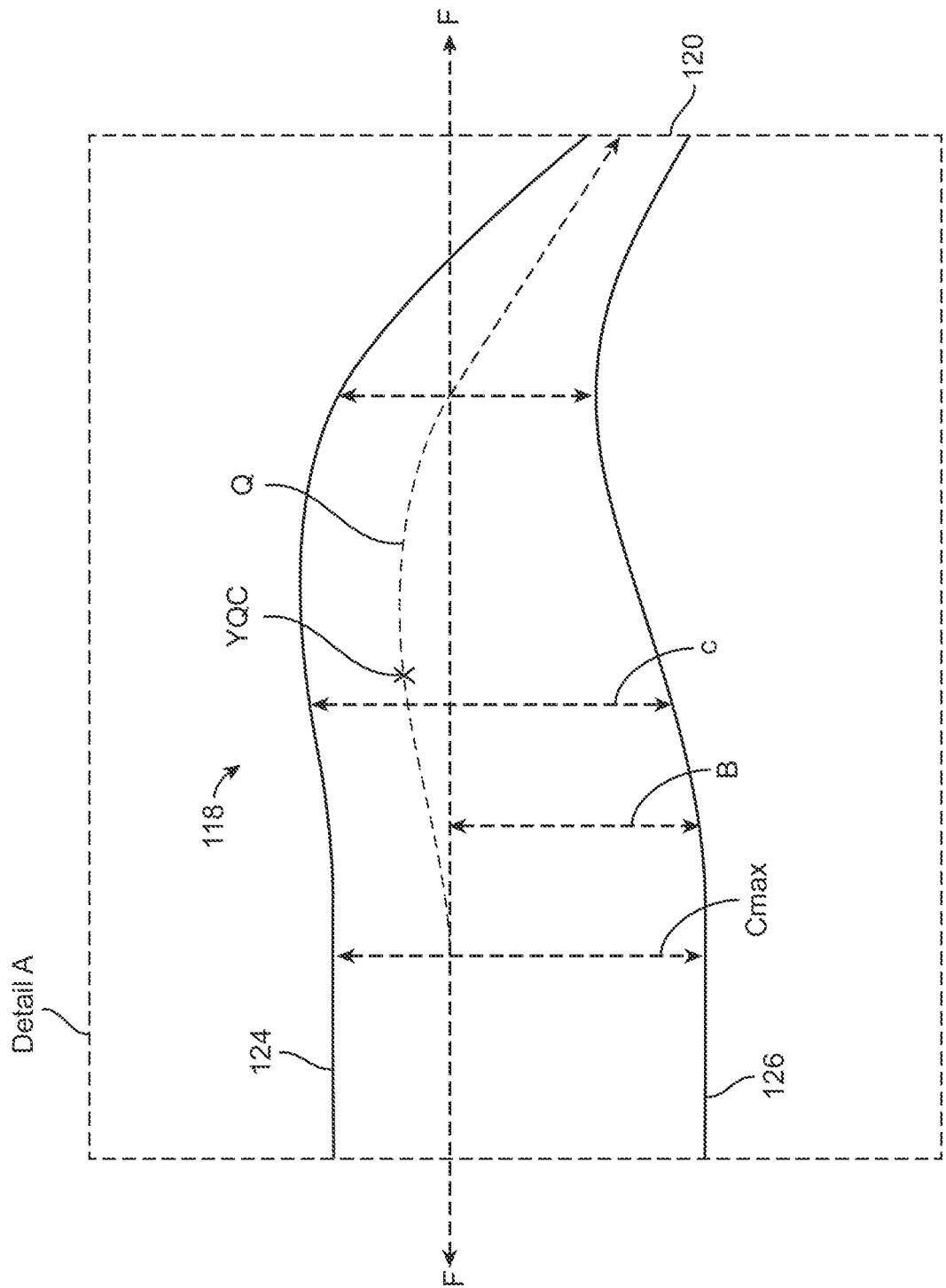
FIG. 3 is a detailed view of Detail A as shown in FIG. 2.
Figure 4:
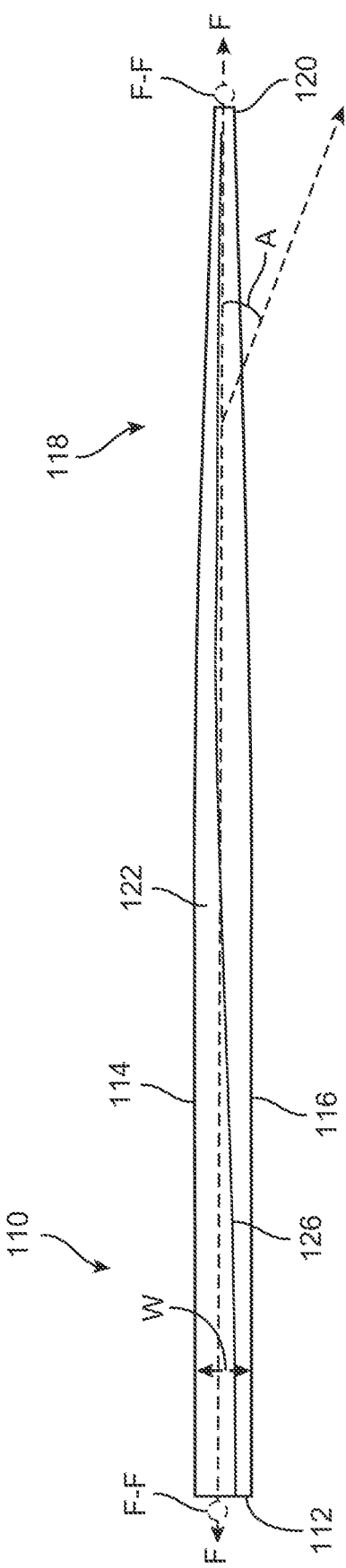
FIG. 4 is a rear view of the rotor blade of FIG. 2.

FIG. 1 is perspective view of a rotary wing aircraft 10. FIGS. 2-4 depict an exemplary aircraft assembly 100 (e.g., rotary system, propulsion system, etc.) or portions thereof. In some embodiments, the aircraft 10 or a rotor blade 24 thereof may include one or more features described in U.S. Pat. Nos. 10,899,440 and 10,648,340, which are incorporated by reference herein in their entireties for the rotary structures and techniques described therein.

FIG. 1 depicts a rotary wing aircraft 10 (e.g., an airframe, an aircraft, a rotorcraft, etc.) having a main rotor assembly 12. The aircraft 10 includes an airframe 14 having an extending tail 16 which mounts an anti-torque system, such as a tail rotor assembly 18. The main rotor assembly 12 is driven about a rotor axis of rotation M through a transmission 20 by one or more engines 22. The main rotor assembly 12 includes a plurality of rotor blades 24 mounted to a rotor hub 26, and a swashplate 28 that is used to affect a state or orientation of the rotor blades 24. The rotor blades 24 can have a variable pitch that can be used to affect pitch and roll angles of the aircraft 10 as well as velocity of the aircraft 10. The pitch of the rotor blades 24 can be controlled by a collective control or by a cyclic control, for example.

FIG. 2 is a top view of a rotor blade of a rotor blade assembly, according to an exemplary embodiment. In some embodiments, the rotor blade assembly 100 is included in the main rotor system 12 of FIG. 1. The rotor blade assembly 100 includes a hub system 102 (e.g., hub body, rotor hub, etc.) coupled (e.g., mounted, attached, fixed, welded, fastened, riveted, bonded, pinned, etc.) to the rotary wing aircraft 10 (e.g., an airframe, an aircraft, a rotorcraft, etc.), as seen in FIG. 1. In some embodiments, the hub system 102 includes a rotor mast 104 and a single main rotor hub 106 coupled to the rotor mast 104. The rotor mast 104 extends upwardly along and around the rotor axis of rotation M and is rotated about the rotor axis of rotation M relative to the aircraft 10 to rotate the main rotor hub 106 about the rotor axis of rotation M.

FIG. 3 is a detailed view of Detail A as shown in FIG. 2, according to an exemplary embodiment. Referring to FIGS. 2-3, in some embodiments, the rotor blade assembly 100 includes a rotor blade 108 (e.g., blade spar, etc.). In some embodiments, the rotor blade 108 is one of the rotor blades 24 of the plurality of rotor blades 24, as seen in FIG. 1. The rotor blade 108 may be made of a layered composite structure and is coupled to the main rotor hub 106. The rotor blade 108 extends radially outward from the main rotor hub 106 and is orthogonal to the rotor axis of rotation M. The rotor blade 108 rotates about the rotor axis of rotation M along with the main rotor hub 106 to produce a propulsion or lift force to move, for example, the aircraft 10.

FIG. 4 is a rear view of the rotor blade of FIG. 2, according to an exemplary embodiment. Referring to FIGS. 2-4, in some embodiments, the rotor blade 108 includes an inboard region 110. The inboard region 110 is a region of the rotor blade 108 that is closest to the hub system 102. The rotor blade 108 includes a blade root 112 at an innermost point of the inboard region 110. In some embodiments, the inboard region 110 extends from the blade root 112 to approximately r/R=0.2, where R is a radius of the rotor blade 108 and r is a radial location. The rotor blade 108 is coupled to the main rotor hub 106 at the blade root 112. During rotor blade operating conditions, the rotor blade 108 experiences significant loads at the blade root 112. Accordingly, to improve structural integrity, the rotor blade 108 may have a rotor blade thickness W that is greatest (i.e., a maximum value, a maximum rotor blade thickness, etc.) at the blade root 112, where the rotor blade thickness W is measured from a lower surface 114 of the rotor blade 108 to an upper surface 116 of the rotor blade 108. Referring to FIG. 2, in some embodiments, the rotor blade 108 includes an outboard region 118. The outboard region 118 is a region of the rotor blade 108 that is farthest away from the hub system 102. The rotor blade 108 also includes a blade tip 120. The blade tip 120 is located at an outermost point of the outboard region 118. In some embodiments, the outboard region 118 extends from approximately r/R=0.8 to the blade tip 120. The blade tip 120 may be curved upwardly curved, downwardly curved, or have no curve.

Referring to FIG. 2-4, the rotor blade 108 includes a blade body 122. The blade body 122 extends from the blade root 112 to the blade tip 120 such as to define a radius R (e.g., span, etc.) of the rotor blade 108. A particular spanwise location along the radius R of the rotor blade is defined as a radial location r (e.g., spanwise position, etc.). Further, the radius R extends from the blade root 112 to the blade tip 120 orthogonally to the main rotor axis M. In this way, the rotor blade 108 may also define a feathering axis F (e.g., spanwise axis, etc.) extending from the blade root 112 to the blade tip 120. The feathering axis F extends parallel to the radius R, and in some embodiments, may coincide with the radius R. In some embodiments, the feathering axis F extends through the blade tip 120 such as to define an angle A between the blade tip 120 that is upwardly curved (e.g., a dihedral angle, etc.) or downwardly curved (e.g., an anhedral angle, etc.). In some embodiments in which the blade tip 120 is neither upwardly curved nor downwardly curved, the feathering axis F extends through the blade tip such that the anhedral angle is approximately 0 degrees, inclusive (e.g., −2 degrees, −1 degrees, 0 degrees, 1 degrees, 2 degrees, etc.). In this way, the rotor blade 108 provides enhanced hover performance. Further, the rotor blade 108 extends from the blade root 112 to the blade tip 120 such as to define a leading edge 124 and a trailing edge 126 of the rotor blade 108.

FIG. 5 is a chart describing an airfoil distribution of the rotor blade. Referring to FIGS. 2 and 5, in some embodiments, the rotor blade 108 has a shape associated with one or more defined airfoil designs (e.g., an airfoil series developed by the National Advisory Committee for Aeronautics (NACA), etc.). As shown in FIG. 5, in some embodiments, the blade body 122 has an airfoil distribution (e.g., a rotor blade shape, etc.) that corresponds to a plurality of airfoil segments 128 (e.g., a plurality of airfoil designs, etc.). The plurality of airfoil segments 128 may be integrally formed such that the blade body 122 is continuous. Each of the plurality of airfoil segments 128 may also vary in length based on a range of radial locations r (i.e., a radial region, a radial range, etc.) through which each airfoil segment 128 extends. For example, referring to FIG. 5, in some embodiments, the blade body 122 includes the plurality of airfoil segments 128 that correspond to a first example airfoil design EX1, a second example airfoil design EX2, a third example airfoil design EX3, and a fourth example airfoil design EX4. In an exemplary embodiment, the blade body 122 has an airfoil distribution including the first example airfoil design EX1 in a range of approximately r/R=0 to r/R=0.40, the second example airfoil design EX2 in a range of approximately r/R=0.40 to r/R=0.85, the third example airfoil design EX3 in a range of approximately r/R=0.85 to r/R=0.96, and the fourth example airfoil design EX4 in a range of approximately r/R=0.97 to r/R=1.

Referring to FIGS. 2-3, in some embodiments, the leading edge 124 and the trailing edge 126 define a chord length c of the rotor blade 108. The chord length c is a measurement extending between the leading edge 124 and the trailing edge 126 at a particular radial location r of the rotor blade 108. A normalized chord length $c/C_{ref}$ (e.g., a nondimensional chord length, etc.) at a normalized radial location r/R (e.g., nondimensional radial location, etc.) can be determined by comparing the chord length c at a radial location r to a reference chord length $C_{ref}$. In at least one exemplary embodiment, the reference chord length $C_{ref}$ is approximately 24 inches, inclusive (e.g., 22 inches, 23 inches, 24 inches, 25 inches, 26 inches, etc.). Accordingly, where the reference chord length $C_{ref}$ is approximately 24 inches, the reference chord length $C_{ref}$ is located at approximately r/R=0.53.

FIGS. 7A-7C illustrate the chord length c of the rotor blade 108 by plotting the normalized chord length $c/C_{ref}$ relative to a normalized radial location r/R, according to an exemplary embodiment. Referring to FIGS. 2 and 7A-7B, in some embodiments, the chord length c varies based on the radial location r such that the chord length c includes a first chord length $C_{max}$ (e.g., a maximum chord length, etc.). Generally, variations in the chord length c are referred to as "taper." In some embodiments, the first chord length $C_{max}$ is a maximum chord length c relative to the chord length c measured at any other radial location r. Further, the rotor blade 108 may be tapered such that the chord length c begins to increase at r/R=0.30 and reaches the maximum chord length $C_{max}$ at a given radial location r*. After reaching the maximum chord length $C_{max}$ at the given radial location r*, the maximum chord length $C_{max}$ may then begin to decrease. Although the above description is with respect to the given radial location r*, the above description may also correspond to a range of radial locations r (e.g., a given radial region, etc.). For example, in at least one exemplary embodiment, within the given radial region from approximately r/R=0.75 to r/R=0.85, the maximum chord length $C_{max}$ begins to decrease.

For example, FIGS. 7A and 7B illustrate a chord distribution of the chord length c, according to an exemplary embodiment. Referring to FIGS. 2 and 7A-7C, in at least one exemplary embodiment, the chord distribution includes a constant normalized chord length $c/C_{ref}$ from the blade root 112 to a radial location $r_1$. From the radial location $r_1$ to a radial location $r_2$, the chord distribution may be determined using Equation 1:

$$C_{sine} = C_1 + A\left(1 + \sin\left[\left(\frac{r - r_1}{r_2 - r_1}\right)\pi - \frac{\pi}{2}\right]\right) \quad \text{Equation 1}$$

From the radial location $r_2$ to a radial location $r_3$, the chord distribution includes a constant normalized chord length $c/C_{ref}$. From the radial location $r_3$ to the blade tip 120, the chord distribution may be determined using Equation 2:

$$C_{cosine} = C_{tip} + (C_3 - C_{tip})\left(\cos\left[\left(\frac{r-r_3}{1-r_3}\right)\frac{\pi}{2}\right]\right) \quad \text{Equation 2}$$

In at least one exemplary embodiment, the radial location $r_1$ corresponds to approximately r/R=0.3, the radial location $r_2$ corresponds to approximately r/R=0.75, the radial location $r_3$ corresponds to approximately r/R=0.85, $C_1$ corresponds to approximately $c/C_{ref}$=0.85, $C_3$ corresponds to approximately $c/C_{ref}$=1.15, and $C_{tip}$ corresponds to approximately $c/C_{ref}$=0.3.

Referring to FIGS. 2-3 and 7A-7C, as described above, the chord length c varies from the blade root 112 to the blade tip 120. Particularly, the chord length c decreases (e.g., tapers, etc.) from the blade root 112 to the blade tip 120. In particular embodiments, as the rotor blade 108 tapers, the rotor blade 108 may also include portions that are forward-swept (e.g., forward sweep, etc.) or aft-swept (e.g., backward sweep, etc.). For example, referring to FIG. 3, as the rotor blade 108 tapers, a first portion of the leading edge 124 extends away from the feathering axis F in parallel with a quarter chord Q, discussed in further detail below. In other words, the first portion of the leading edge 124 extends toward a first direction such that the rotor blade 108 is forward-swept. A second portion of the leading edge 124 extends toward the feathering axis F in parallel with the quarter chord Q. In other words, the second portion of the leading edge 124 extends toward a second direction such that the rotor blade 108 is aft-swept. Similarly, as the rotor blade 108 tapers, a first portion of the trailing edge 126 extends toward the feathering axis F in parallel with the quarter chord Q. In other words, the first portion of the trailing edge 126 extends toward the first direction such that the rotor blade 108 is forward-swept. A second portion of the trailing edge 126 extends away from the feathering axis F in parallel with the quarter chord Q. In other words, the second portion of the trailing edge 126 extends toward the second direction such that the rotor blade 108 is aft-swept. In some embodiments, the first portion of the leading edge 124 and the first portion of the trailing edge 126 extend in the first direction in parallel with one another. In other words, the first portion of the leading edge 124 and the first portion of the trailing edge 126 extend in the first direction at the same radial location r or within the same range of radial locations r (e.g., a same radial region, etc.). In some embodiments, the second portion of the leading edge 124 and the second portion of the trailing edge 126 extend in the second direction in parallel with one another. In other words, the second portion of the leading edge 124 and the second portion of the trailing edge 126 extend in the second direction at the same radial location r or within the same range of radial locations r (e.g., a same radial region, etc.).

Referring back to FIG. 2, because the trailing edge 126 includes the first portion and the second portion that extend toward the first direction and the second direction, respectively, the trailing edge 126 and the feathering axis F define a distance extending between the trailing edge 126 and the feathering axis F. In some embodiments, the first portion of the trailing edge 126 extends toward the first direction such that, at a given radial location r*, the distance begins to decrease from a first distance B. In some embodiments, the first distance B is greater than a distance measured from the trailing edge to the feathering axis at any other radial location r (e.g., a maximum distance, etc.).

FIGS. 8A-8C illustrate a sweep distribution of the rotor blade 108 by plotting a normalized chord-wise quarter chord YQC/$C_{ref}$ location relative to a normalized radial location r/R, according to an exemplary embodiment. Referring to FIGS. 2-3 and 8A-8C, the leading edge 124, the trailing edge 126, and the chord length c define a chord-wise quarter chord location YQC. The chord-wise quarter chord location YQC is a location along the chord length c that is one quarter of the way from the leading edge 124 towards the trailing edge 126. Collectively, the chord-wise quarter chord locations YQC from the blade root 112 to the blade tip 120 define a quarter chord Q. The quarter chord Q extends from the blade root 112 to the blade tip 120 and defines an aerodynamic center of the rotor blade 108. In some embodiments, the quarter chord Q is coincident with the feathering axis F. A normalized chord-wise quarter chord location YQC/$C_{ref}$ (e.g., a nondimensional quarter chord length, etc.) at a normalized radial location r/R (e.g., nondimensional radial location, etc.) can be determined by comparing the chord-wise quarter chord location YQC to the reference chord length $C_{ref}$ at a radial location r. Further, the normalized chord-wise quarter chord location YQC/$C_{ref}$ is an indication of the sweep of the rotor blade 108. Referring to FIGS. 8A-8C, in at least one exemplary embodiment, the rotor blade 108 is swept such that YQC/$C_{ref}$=0 in a range of approximately r/R=0 to r/R=0.83, the normalized chord-wise quarter chord location YQC/$C_{ref}$ decreases in a range of approximately r/R=0.83 to r/R=0.91, the normalized chord-wise quarter chord YQC/$C_{ref}$=−0.14 in a range of approximately r/R=0.91 to r/R=0.92, and the normalized chord-wise quarter chord YQC/$C_{ref}$ decreases in a range of approximately r/R=0.92 to r/R=1 such that YQC/$C_{ref}$=0.6 at the blade tip 120.

FIGS. 8A-8C depict an exemplary embodiment of a sweep distribution of the normalized chord-wise quarter chord location YQC/$C_{ref}$ of the rotor blade 108 from the blade root 112 to the blade tip 120. Referring to FIGS. 8A-8C, in at least one exemplary embodiment, the sweep distribution includes a constant normalized chord-wise quarter chord location YQC/$C_{ref}$ from the blade root 112 to a radial location $r_1$. From the radial location $r_1$ to a radial location $r_2$, the sweep distribution may be determined using Equation 3:

$$QC_{sine} = QC_1 + A\left(1 + \sin\left[\left(\frac{r-r_1}{r_2-r_1}\right)\pi - \frac{\pi}{2}\right]\right) \quad \text{Equation 3}$$

From the radial location $r_2$ to a radial location $r_3$, the sweep distribution includes a constant normalized chord-wise quarter chord location YQC/$C_{ref}$. From the radial location $r_3$ to the blade tip 120, the sweep distribution may be determined using Equation 4:

$$QC_{cosine} = QC_{tip} + (QC_3 - QC_{tip})\left(\cos\left[\left(\frac{r-r_3}{1-r_3}\right)\frac{\pi}{2}\right]\right) \quad \text{Equation 4}$$

In at least one exemplary embodiment, the radial location $r_1$ is approximately r/R=0.83, the radial location $r_2$ is approximately r/R=0.91, the radial location $r_3$ is approximately r/R=0.92, $QC_1$ corresponds to approximately $c/C_{ref}$=0, $QC_3$ corresponds to approximately $c/C_{ref}=-0.14$, and $QC_{tip}$ corresponds to approximately $c/C_{ref}=0.6$.

Referring generally to FIGS. 2-4, under rotor blade operating conditions, a rotational velocity of the rotor blade 108 is greater at the blade tip 120 than a rotational velocity at the blade root 112, which may result in an uneven lift distribution. To provide a more even lift distribution, the rotor blade 108 includes local pitch angles P. Each of the local pitch angles P is defined as an angle between the chord length c at a radial location r/R (e.g., the chord length c of a local airfoil element, etc.) and a reference plane Z-Z, the reference plane Z-Z being a plane orthogonal to the rotor axis of rotation M and coplanar with the feathering axis F. The local pitch angle P can also be defined as a summation of an overall pitch angle of the rotor blade 108 and a local twist angle T, discussed below. Notably, adjusting the local pitch angle P changes the lift and drag of the rotor blade 108. For example, by increasing the local pitch angle P, the rotor blade 108 may provide more lift. Conversely, by decreasing the local pitch angle P, the rotor blade 108 may provide less lift. In this way, varying the local pitch angles P may provide a more even lift distribution.

Figures 6A, 6B:
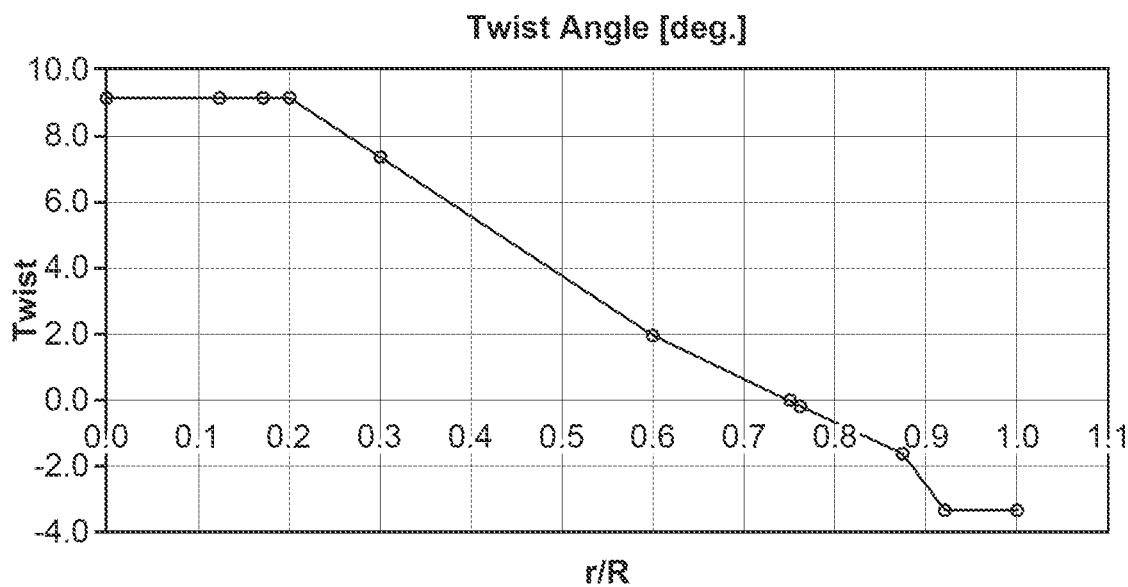
FIG. 6A is a graph illustrating a local twist angle of the rotor blade relative to a normalized radial location, according to an exemplary embodiment.
FIG. 6B is a chart describing the local twist angle of the rotor blade at a normalized radial location as shown in FIG. 6A.

As described above, varying the local pitch angles P may provide a more even lift distribution. This may also be achieved through varying the local twist angles T. FIGS. 6A-6B illustrate the local twist angles T of the rotor blade 108 relative to a normalized radial location r/R. Specifically, as the local twist angle T increases, the local pitch angle P increases. Like varying the local pitch angle P, varying the local twist angle T changes the lift and drag. Particularly, this is accomplished by twisting the rotor blade 108 such that, at the blade root 112, the local twist angle T is greater than the local twist angle T at the blade tip 120. In some embodiments, the twist angle T=0 degrees at approximately r/R=0.75.

Referring to FIG. 6A-6B, at the blade root 112, the local twist angle T is a maximum twist angle. In at least one embodiment, the local twist angle T is constant in the ranges of approximately r/R=0 to r/R=0.2 and approximately r/R=0.92 to r/R=1, and decreases in the range of approximately r/R=0.2 to r/R=0.92. Accordingly, from the blade root 112 to the blade tip 120, the local twist angle T includes a negative gradient region disposed between a first zero gradient region at the blade root 112 and a second zero gradient region at the blade tip 120. In at least one exemplary embodiment, the local twist angle T decreases in the range of approximately r/R=0.2 to r/R=0.92 such that the negative gradient is approximately 17.326 degrees per r/R. Further, the local twist angle T of the first zero gradient region is approximately 9.15 degrees, the local twist angle T of the second zero gradient region is approximately -3.325 degrees, and the local twist angle T changes from a positive value to a negative value at approximately r/R=0.75 such that the local twist angle T is approximately zero degrees.

Referring to FIGS. 6A-6B, 7A-7C, and 8A-8C, the rotor blade may be tailored for a flight condition (e.g., forward flight, hover performance, etc.). For example, the rotor blade may be optimized such that the chord length the chord length is constant in a range of approximately r/R=0 to r/R=0.30, increasing in a range of approximately r/R=0.30 to r/R=0.75, constant in a range of approximately r/R=0.75 to 0.85, and decreasing in a range of approximately r/R=0.85 to r/R=1. In at least one exemplary embodiment, $c/C_{ref}=0.85$ in the range of approximately r/R=0 to r/R=0.30, $c/C_{ref}=1.15$ at approximately r/R=0.75, $c/C_{ref}=1.15$ in the range of approximately r/R=0.75 to 0.85, and $c/C_{ref}=0.30$ in the range of approximately r/R=0.85 to r/R=1. Accordingly, the rotor blade has a neutral sweep in a range of approximately r/R=0 to r/R=0.83, a forward sweep in a range of approximately r/R=0.83 to r/R=0.92, and an aft sweep in a range of approximately r/R=0.92 to r/R=1. The forward sweep may reach a maximum value of approximately $YQC/C_{ref}=-0.14$ at approximately r/R=0.91, and the aft sweep may reach a maximum value of approximately $YQC/C_{ref}=0.60$ at approximately r/R=1.

Further, in some embodiments, the rotor blade may be manufactured such that the local twist angle of the rotor blade is constant in the ranges of approximately r/R=0 to r/R=0.2 and r/R=0.92 to r/R=1, and decreases in a range of approximately r/R=0.2 to r/R=0.92. In at least one exemplary embodiment, the local twist angle is approximately 9.15 degrees in the range of approximately r/R=0 to r/R=0.2, approximately -3.325 degrees in the range of approximately r/R=0.92 to r/R=1, and transitions from the positive twist value to the negative twist value at approximately r/R=0.75.

In some embodiments, the rotor blade assembly 100 includes a trailing edge assembly 130. The trailing edge assembly 130 is configured to produce additional lift for the rotor blade 108 and to be selectively deployed. Accordingly, the trailing edge assembly 130 is configured to be deployed for enhanced hover performance or undeployed (stowed) to enhance forward flight performance. However, the trailing edge assembly 130 may also be deployed during forward flight if additional lift or thrust is needed (e.g., to delay stall during a flight maneuver, etc.).

For example, in some embodiments, the trailing edge assembly 130 (e.g., an active flow control device, etc.) includes a trailing edge flap 132. The trailing edge flap 132 extends along the trailing edge 126 of the rotor blade 108. In some embodiments, the trailing edge flap 132 extends from the inboard region 110 of the rotor blade 108 towards the outboard region 118 of the rotor blade 108. For example, the trailing edge flap 132 may extend from the blade root 112 to a radial location r. In some embodiments, the trailing edge flap 132 extends along the trailing edge 126 from the inboard region 110 to approximately r/R=0.80, inclusive. In some embodiments, r/R may be about 0.70, about 0.75, about 0.80, about 0.85, or about 0.90, etc. Further, the trailing edge flap 132 may extend along the trailing edge 126 such that an effect on other portions of the rotor blade 108 is minimized. In other words, the trailing edge flap 132 is localized to the trailing edge 126 to reduce or avoid an effect on the aerodynamics of the rest of the rotor blade 108.

In some embodiments, the trailing edge flap 132 includes at least one flap segment extending from the inboard region 110 towards the outboard region 118. In some embodiments, the trailing edge flap 132 extends along the trailing edge 126 such that the trailing edge flap 132 is curvilinear. The trailing edge flap 132 may include more than one flap segment extending from the inboard region 110 towards the outboard region 118. For example, in some embodiments, the trailing edge flap 132 may include up to 20 flap segments, inclusive. In some embodiments, the trailing edge flap 132 may include 18 flap segments, 19 flap segments, 20 flap segments, 21 flap segments, 22 flap segments, etc. or an alternative number of flap segments.

As described above, the trailing edge assembly 130 is configured to, when deployed, produce additional lift. The trailing edge assembly 130 produces additional lift by deflecting the trailing edge flap 132 at an angle relative to the rotor blade 108. However, deploying the trailing edge assembly 130 also produces additional drag, which may be undesirable for certain flight conditions. The trailing edge flap 132 is configured to be selectively deployed between at least a first position and a second position. At least one of the first position and the second position is defined as an undeployed (stowed) position, and the other of the first position and the second position is defined as the deployed position. For example, assuming that the first position is defined as the undeployed position and the second position is defined as the deployed position, in the undeployed position, the trailing edge flap 132 is not deflected at an angle relative to the rotor blade 108. Thus, in the undeployed position, the upper surface of the trailing edge flap 132 is continuous with the upper surface 116 of the rotor blade 108, and a lower surface of the trailing edge flap 132 is continuous with the lower surface 114 of the rotor blade 108. Accordingly, the upper surface conforms in surface profile (e.g., with respect to a contour) to that of the rotor blade 108.

In the deployed position, the trailing edge flap 132 is deflected at a deflection angle D (e.g., deployed angle, etc.) relative to the rotor blade 108. Thus, when deflected, the trailing edge flap 132 is inclined relative to the upper surface 116 of rotor blade 108. The trailing edge flap 132 in such a position differs in surface profile from that of the rotor blade 108. In some embodiments, the segment deflection angle D of the at least one flap segment is based on, at the radial location r of the at least one flap segment, the chord length c of the rotor blade 108 and the local twist angle T of the rotor blade 108. Further, the local twist angle T and/or the chord length c may vary from the inboard region 110 or the blade root 112 to the outboard region 118 or the blade tip 120, respectively. In some embodiments, the deflection angle D has a maximum deflection angle of approximately 20°, inclusive. For example, the maximum deflection angle may be about 15°, about 18°, about 20°, about 22°, or about 25°, etc. Although the discussion of the exemplary embodiment describes the trailing edge assembly 130 as having the first position and the second position, the trailing edge assembly 130 is not so limited and may include a plurality of positions.

As described above, in some embodiments, each of the plurality of flap segments may have a segment deflection angle D. To that effect, each of the plurality of flap segments may be selectively deployed or individually controlled such that each segment deflection angle D is specific to each flap segment. For example, when the plurality of flap segments is in the second position, each of the plurality of flap segments has a segment deflection angle D to enhance flight performance. In some embodiments, a segment of the plurality of flap segments closest to the blade root 112 has a segment deflection angle D that is the maximum deflection angle. As described above, the maximum deflection angle may have a magnitude of about 200 or less in some embodiments. However, in some embodiments, the maximum deflection angle may be about 15°, about 18°, about 20°, about 22°, or about 25°, etc. In some embodiments, the segment deflection angle D of each flap segment decreases as the trailing edge flap 132 extends from the inboard region 110 towards the outboard region 118. Similarly, in some embodiments, each segment deflection angle D corresponds to, at a radial location r of each flap segment, the chord length c of the rotor blade 108 and the local twist angle T of the rotor blade 108.

In some embodiments, the trailing edge assembly 130 includes an actuator 134 (e.g., a controller, etc.). The actuator 134 is operatively coupled to the trailing edge flap 132 and configured to selectively deploy the trailing edge flap 132 between the first position and the second position. In some embodiments, the actuator 134 is disposed within the blade body 122. In some embodiments, the actuator 134 is configured for low-frequency actuation (i.e., a low frequency actuator, etc.). For example, the actuator 134 may be configured for low frequency actuation such that more than one rotor blade 108 revolution occurs while deploying the trailing edge flap 132 between the first position and the second position. Unlike other systems utilizing flap devices with actuators that are continuously activated and deactivated at high frequencies, by using the low frequency actuator 134, the trailing edge assembly 130 may deploy the trailing edge flap 132 only when necessary and may require less power as compared to other systems with actuators not employing low frequency actuation. In some embodiments, the actuator 134 is configured to selectively deploy the trailing edge flap 132 to the deflection angle D. In some embodiments, the actuator 134 is configured to selectively deploy or individually control each flap segment of the plurality of flap segments. Accordingly, each flap segment can be deployed or deflected at a different deflection angle D to enhance flight performance.

III. Example Method for Providing a Rotor Blade

Figure 9:
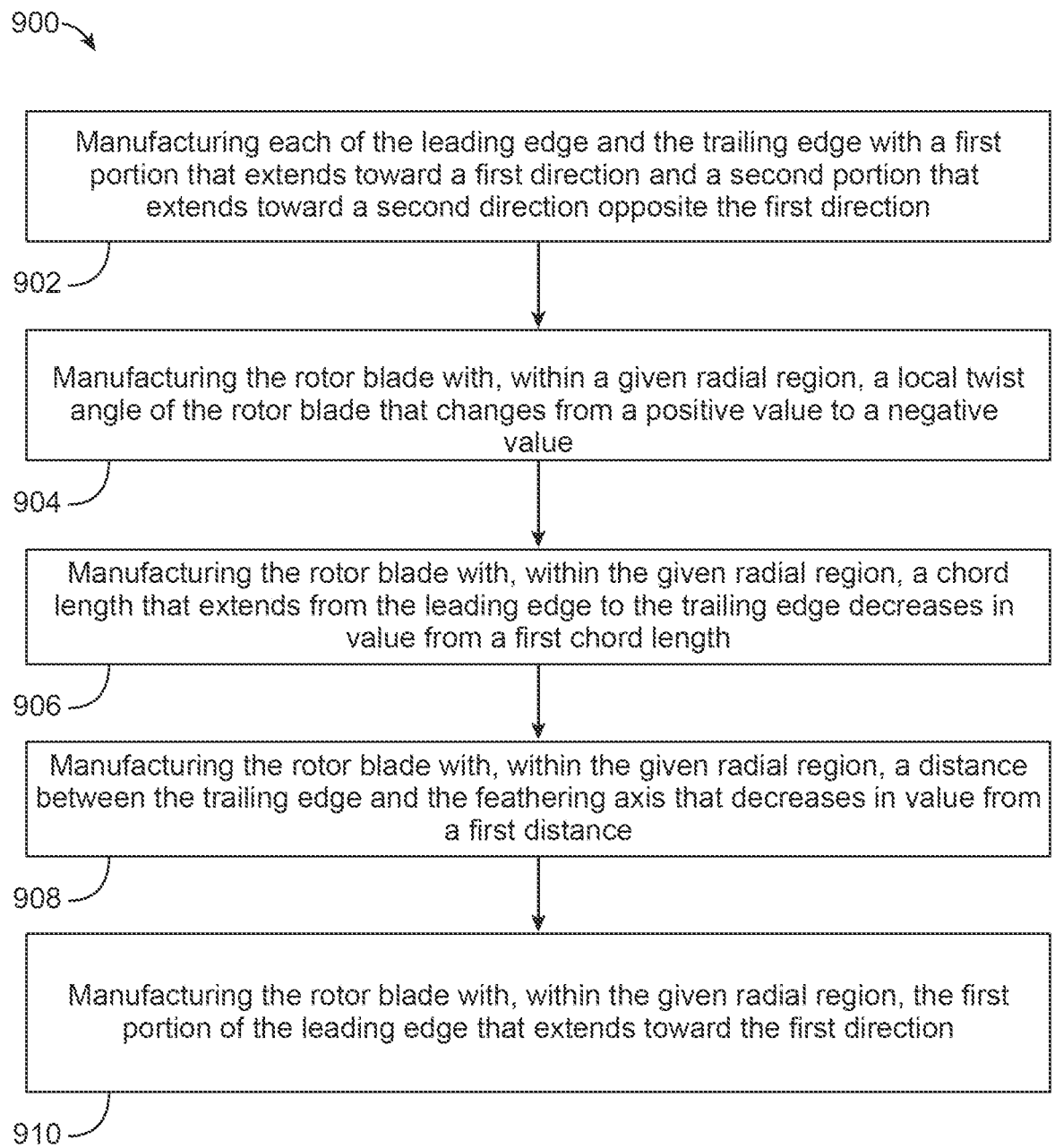
FIG. 9 is a flowchart illustrating a method of providing the rotor blade, according to an exemplary embodiment.

FIG. 9 illustrates a method 900 (e.g., method, etc.) for manufacturing a rotor blade 108 of the rotor blade assembly 100 conducive to forward flight and increased hover performance during hovering flight. The method may be performed by, including but not limited to, an original manufacturer or the like.

The method 900 begins (step 902) by manufacturing each of the leading edge 124 and the trailing edge 126 with a first portion that extends toward a first direction and a second portion that extends toward a second direction opposite the first direction. In this way, the rotor blade 108 has a unique chord distribution and a unique sweep distribution. In at least one exemplary embodiment, the unique chord distribution and the unique sweep distribution may be tailored for forward flight and enhanced hover performance during hovering flight.

The method 900 continues by manufacturing the rotor blade 108 with, within a given radial region, (step 904) a local twist angle T of the rotor blade 108 that changes from a positive value to a negative value, (step 906) a chord length c extending from the leading edge 124 to the trailing edge 126 that decreases in value from a first chord length $C_{max}$, (step 908) a distance between the trailing edge 126 and the feathering axis F that decreases in value from a first distance B, and (step 910) the first portion of the leading edge 124 that extends toward the first direction. It should be noted that steps 904-910 may be performed in any order and that two or more steps may be performed concurrently.

In some embodiments, the method 900 may optionally include manufacturing the blade tip 120 such that (i) the feathering axis F passes through the blade tip 120, and (ii) an anhedral angle A is approximately zero degrees, the anhedral angle A being defined as an angle between the feathering axis F and a downward curvature of the rotor blade 108. As a result, the blade tip 120 is neither upwardly curved nor downwardly curved, and the anhedral angle A is approximately 0°, inclusive (e.g., −5°, −2°, 0°, 2°, 5°, etc.). In this way, enhanced forward flight performance is maintained by lessening aerodynamic penalties as compared to other rotor blades having non-zero anhedral angles.

In some embodiments, the method 900 may optionally include manufacturing the rotor blade 108 with the local twist angle T such that the local twist angle T is a constant value in the range of approximately r/R=0 to r/R=0.2 and r/R=0.92 to r/R=1, and decreases in value in a range of approximately r/R=0.2 to r/R=0.92; manufacturing the rotor blade 108 with the chord length c such that the chord length c is a constant value in a range of approximately r/R=0 to r/R=0.30, increases in value in a range of approximately r/R=0.30 to r/R=0.75, has another constant value in a range of approximately r/R=0.75 to 0.85, and decreases in value in a range of approximately r/R=0.85 to r/R=1; and manufacturing the rotor blade 108 such that the rotor blade 108 has a neutral sweep in a range of approximately r/R=0 to r/R=0.83, a forward-aft sweep in a range of approximately r/R=0.83 to r/R=0.92, and an aft-sweep in a range of approximately r/R=0.92 to r/R=1, where R is a radius of the rotor blade 108 and r is a radial location measured from the blade root 112.

In some embodiments, the method 900 may optionally include manufacturing the rotor blade 108 such that the local twist angle T is approximately 9.15 degrees in the range of approximately r/R=0 to r/R=0.2, approximately −3.325 degrees in the range of approximately r/R=0.92 to r/R=1, and transitions from the positive value to the negative value at approximately r/R=0.75; manufacturing the rotor blade 108 such that approximately $c/C_{ref}$=0.85 in the range of approximately r/R=0 to r/R=0.30, approximately $c/C_{ref}$=1.15 at approximately r/R=0.75, approximately $c/C_{ref}$=1.15 in the range of approximately r/R=0.75 to r/R=0.85, and approximately $c/C_{ref}$=0.30 in the range of approximately r/R=0.85 to r/R=1; and manufacturing the rotor blade 108 such that a normalized chord-wise quarter chord location $YQC/C_{ref}$ is approximately $YQC/C_{ref}$=−0.14 at approximately r/R=0.91, and the normalized chord-wise quarter chord location $YQC/C_{ref}$ is approximately $YQC/C_{ref}$=0.60 at approximately r/R=1, where YQC is a chord-wise quarter chord location relative to the feathering axis F and $C_{ref}$ is a reference chord length.

IV. Configuration of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "about," "approximately," and similar terms are intended to have a broad meaning in harmony with the common and accepted usage by those of ordinary skill in the art to which the subject matter of this disclosure pertains. The term "about" or "approximately" indicates approximations which may vary by 10% of the stated reference value unless otherwise stated or evident from the context. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

In addition, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. A rotor blade of a rotor blade assembly, the rotor blade comprising:
 a blade root;
 a blade tip; and
 a blade body extending from the blade root to the blade tip and comprising a leading edge and a trailing edge, the blade body defining a feathering axis, wherein
 the leading edge and the trailing edge each include a first portion that extends toward a first direction and a second portion that extends toward a second direction opposite the first direction,
 a local twist angle of the rotor blade is approximately 9.15 degrees throughout a first zero gradient region in the range of approximately r/R=0.0 to r/R=0.2, where R is a radius of the rotor blade measured along the feathering axis from the blade root to the blade tip and r is a radial location measured from the blade root along the feathering axis, and
 at a given radial location along the feathering axis in the direction that r/R is increasing, (i) a chord length extending from the leading edge to the trailing edge is decreasing in value from a first chord length, (ii) a distance between the trailing edge and the feathering axis is decreasing in value from a first distance, and (iii) the first portion of the leading edge is extending further in the first direction.

2. The rotor blade according to claim 1, wherein the feathering axis extends through the blade tip such that the blade tip forms an anhedral angle of approximately zero degrees, the anhedral angle being defined as an angle between the feathering axis and a downward curvature of the blade tip.

3. The rotor blade according to claim 1, wherein the given radial location is approximately r/R=0.85, inclusive.

4. The rotor blade according to claim 1, wherein
the rotor blade includes a plurality of airfoil segments extending from the blade root to the blade tip, the plurality of airfoil segments being integrally formed, and
each airfoil segment varies in length based on a radial region through which each airfoil segment extends.

5. The rotor blade according to claim 1, wherein, at the blade root, a local twist angle is a first local twist angle and a rotor blade thickness is a first rotor blade thickness, and
the first local twist angle and the first rotor blade thickness are each a maximum value.

6. The rotor blade according to claim 1, wherein, from the blade root to the blade tip, a local twist angle includes a negative gradient region disposed between the first zero gradient region and a second zero gradient region at the blade tip.

7. The rotor blade according to claim 6, wherein the local twist angle of the second zero gradient region is approximately −3.325 degrees, and the local twist angle changes from a positive value to a negative value at approximately r/R=0.75.

8. The rotor blade according to claim 3, wherein the rotor blade is tapered such that, in the direction that r/R is increasing the chord length begins to increase in value at r/R=0.30 so as to reach the first chord length $c/C_{ref}=1.15$ at the given radial location, where c is the chord length at the radial location r, and $C_{ref}$ is a reference chord length.

9. The rotor blade according to claim 1, wherein, in the direction that r/R is increasing, the rotor blade has a neutral sweep in a range of approximately r/R=0 to r/R=0.83, a forward sweep in a range of approximately r/R=0.83 to r/R=0.91, and an aft sweep in a range of approximately r/R=0.92 to r/R=1 such that $YQC/C_{ref}=0.6$ at the blade tip.

10. The rotor blade according to claim 1, further comprising a trailing edge assembly disposed on the trailing edge and configured to be selectively deployed between at least a first position and a second position, the trailing edge assembly being configured to facilitate hover performance in the second position.

11. The rotor blade of claim 1, wherein the chord length of the rotor blade is constant throughout the range of approximately r/R=0.0 to r/R=0.3.

12. A rotary wing aircraft comprising:
a single main rotor hub configured to receive a rotor blade, the rotor blade comprising:
a blade root coupled to the rotor hub, a blade tip, and a blade body extending from the blade root to the blade tip and comprising a leading edge and a trailing edge, the blade body defining a feathering axis, wherein
the leading edge and the trailing edge each include a first portion that extends toward a first direction and a second portion that extends toward a second direction opposite the first direction,
a local twist angle of the rotor blade is approximately 9.15 degrees in the range of approximately r/R=0.0 to r/R=0.2, where R is a radius of the rotor blade measured along the feathering axis from the blade root to the blade tip and r is a radial location measured from the blade root along the feathering axis, and
within a region defined between a first radial location and a second radial location along the feathering axis, (i) a local twist angle of the rotor blade changes from a positive value to a negative value, (ii) in the direction that r/R is increasing, a chord length extending from the leading edge to the trailing edge decreases in value from a first chord length, (iii) in the direction that r/R is increasing, a distance between the trailing edge and the feathering axis decreases in value from a first distance, and (iv) in the direction that r/R is increasing, the first portion of the leading edge extends further toward the first direction, and
a trailing edge assembly comprising
a trailing edge flap comprising at least one segment and extending along the trailing edge from the blade root towards the blade tip, the trailing edge flap configured to be selectively deployed between at least a first position and a second position, and
an actuator disposed within the blade body and operatively coupled to the trailing edge flap, the actuator being configured to selectively deploy the trailing edge flap between at least the first position and the second position.

13. The rotary wing aircraft according to claim 12, wherein the feathering axis extends through the blade tip such that the blade tip forms an anhedral angle of approximately zero degrees, the anhedral angle being defined as an angle between the feathering axis and a downward curvature of the blade tip.

14. The rotary wing aircraft according to claim 12, wherein the first radial location is approximately r/R=0.75, inclusive, and the second radial location is approximately r/R=0.85, inclusive.

15. The rotary wing aircraft according to claim 12, wherein the at least one segment has a segment deflection angle based on the chord length and the local twist angle, the chord length and the local twist angle varying from the blade root to the blade tip.

16. The rotary wing aircraft according to claim 12, wherein the local twist angle is a constant value in the ranges of approximately r/R=0 to r/R=0.2 and approximately r/R=0.92 to r/R=1, and decreases in value throughout the range of approximately r/R=0.2 to r/R=0.92 in the direction that r/R is increasing.

17. The rotary wing aircraft according to claim 16, wherein the local twist angle decreases in value in the range of approximately r/R=0.2 to r/R=0.92 in the direction that r/R is increasing so as to have a negative gradient of 17.326 degrees per r/R.

18. The rotary wing aircraft according to claim 12, wherein the local twist angle is approximately zero degrees at approximately r/R=0.75.

19. The rotary wing aircraft according to claim 12, wherein, in the direction that r/R is increasing, the first portion of the leading edge extends further toward the first direction throughout a range of approximately r/R=0.83 to r/R=0.91, the second portion of the leading edge extends toward the second direction throughout a range of approximately r/R=0.92 to r/R=1, and the rotor blade has a constant quarter chord $YQC/C_{ref}=-0.14$ throughout a range of approximately r/R=0.91 to r/R=0.92, where YQC is a chordwise quarter chord location relative to the feathering axis, and $C_{ref}$ is a reference chord length.

20. The rotary wing aircraft according to claim 12, wherein
    the first portions of the leading edge and the trailing edge each extend toward the first direction in parallel with a quarter chord of the rotor blade, and
    the second portions of the leading edge and the trailing edge each extend toward the second direction in parallel with the quarter chord.

* * * * *